INVENTOR.
E. E. REED
BY Hudson & Young
ATTORNEYS

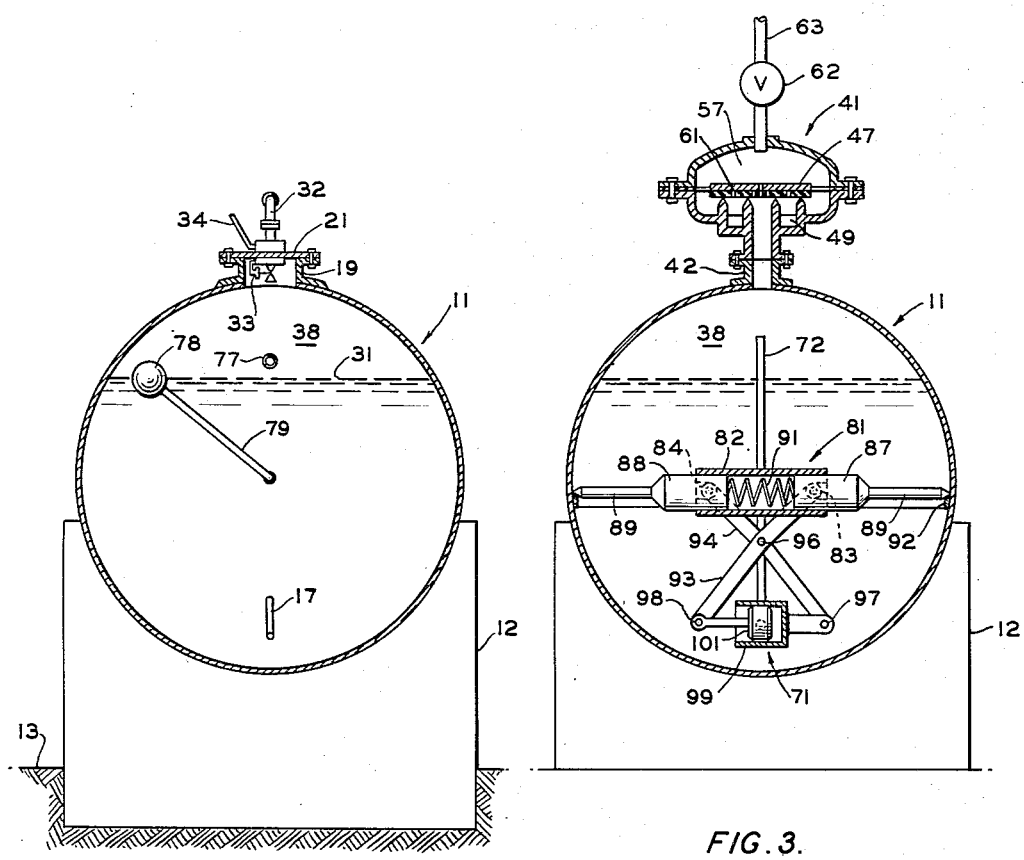
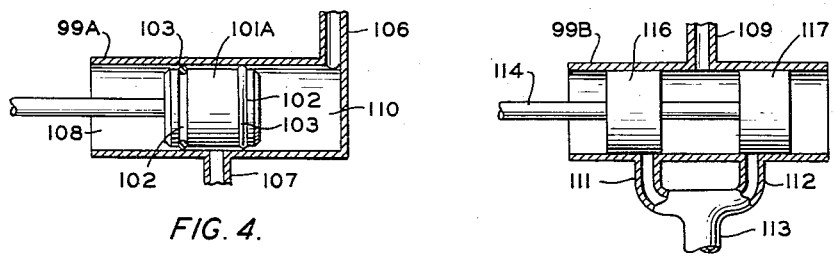
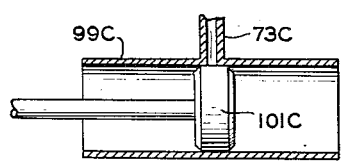

Aug. 28, 1956  E. E. REED  2,760,343
EMERGENCY TANK DEPRESSURING VALVE SYSTEMS AND PROCESSES
Filed June 22, 1953  3 Sheets-Sheet 3

INVENTOR.
E. E. REED
BY Hudson & Young
ATTORNEYS

United States Patent Office 2,760,343
Patented Aug. 28, 1956

2,760,343

EMERGENCY TANK DEPRESSURING VALVE SYSTEMS AND PROCESSES

Edwin E. Reed, Bartlesville, Okla., assignor to Phillips Petroleum Company, a corporation of Delaware Application June 22, 1953, Serial No. 363,220

19 Claims. (Cl. 62—1)

This invention relates to valves, and systems embodying these valves, adapted to depressure tanks containing inflammable liquids when said tanks start to deform and/or yield to an extent indicating impending rupture. From another aspect, this invention relates to a process of relieving substantially all of the pressure in a storage tank for inflammable liquids when the tank is yielding and rupture is impending.

Considerable damage has been experienced in the prior art due to the explosion of tanks containing inflammable liquids, especially when those liquids were of a volatile nature, when storage tanks containing the same have been exposed to fire, and heated to the yielding point of the metal tank walls. It is well known that the tensile strength of steel, and other metals, decreases rapidly at a certain critical temperature for each metal or alloy, and when this temperature is reached, the tank yields rapidly under internal pressure, and will rupture. When rupture occurs a large volume of inflammable material is suddenly added to the fire, and the two ends of the ruptured tank are often driven by the reaction of the escaping fluids to travel through the air for a considerable distance, like a rocket, and thereby further spread destruction.

Obviously, all storage tanks for volatile and inflammable liquids products are provided with a relief valve. The amount of fluids vented through a relief valve is small because as long as the tank retains its strength it is advisable to vent as little fluid through the relief valve as may be necessary to maintain a safe working pressure of several hundred pounds per square inch inside said tank. By having a stack on the relief valve exhaust, the escaping vapors, if they ignite, will burn above the tank and will not heat the same to the yielding point. As long as the tank retains its strength it is undesirable to release any further amount of fluids therefrom. In event some external source of heat, such as liquids burning on the ground and possibly flowing from some other tank, should heat the storage tank in question to the point at which the metal starts to yield, it would then become highly desirable to reduce the pressure in the yielding tank to substantially atmospheric pressure as rapidly as possible, and the fact that this would be accomplished by venting large quantities of fluids in a manner which might add to the conflagration would be the lesser of two evils, the worse evil being for the tank to rupture and the tank ends to rocket through the air and carry the fire and destruction to other parts of the plant, or even to adjacent residential areas.

However, large vapor depressuring vent valves for reducing the fluid pressure in a storage tank to substantially atmospheric pressure are more of a danger than a safety unless properly actuated. Up until the time a tank starts to yield, it is better to have the depressuring valve remain closed, than to open the same, but once the tank starts to yield, then it is better to open the depressuring valve than to have it remain closed. If the valve is operated remotely it cannot be made to fail in open position, for if such were done, any malfunction of the operating system would release the tank contents, which could happen at any time causing a severe accident without any advantage. If the remote control system is reverse acting and would fail in closed position, it might easily become damaged and rendered inoperative prior to the time it was desired to empty the contents of the tank, and as almost any structure near the tank can be damaged in the type of severe fire contemplated such a system could not be considered desirable. Considering the human element, it is not desirable to have a device such that the flick of a lever would discharge the tank contents. In order to serve its purpose as an emergency device, it definitely could not be locked, and therefore it could be tripped by pranksters or by careless, inexperienced, or confused operators. A fire that was being brought under control might be thrown out of control by some excited individual tripping the depressuring device in panic. If the depressuring valve were operated by a fuse plug, it might operate prematurely. It would be difficult to have the fuse plugs in each location reach the exact tank wall temperature, and a temporary temperature of even 1200° F. on the outside of the tank shell, while far from desirable, does not necessarily mean a ruptured tank.

The present invention overcomes the difficulties of the prior art by providing a valve system and process for reducing the internal pressure of the tank substantially to atmospheric pressure when the tank actually starts to yield, and only when such yielding commences, by means adjacent to or inside the tank which will not be subject to being rendered inoperative by a fire, nor be capable of being actuated prematurely.

One object of this invention is to prevent explosion of storage tanks of volatile inflammable liquids in case of fire.

Another object is to provide means to reduce the internal pressure in such a tank to substantially atmospheric pressure upon the walls starting to yield but not before such yielding starts.

Another object is to provide an improved process of relieving tank pressure before rupture of the tank occurs.

Another object is to provide an improved vapor vent valve and improved systems for operating the same.

Other objects are the provision of simple, rugged, foolproof systems and apparatus for carrying out the above mentioned process.

Numerous other objects and advantages will be apparent to those skilled in the art upon reading the accompanying specifications, claims and drawings.

In the drawings:

Figure 2 is a cross-sectional elevational view taken along the line 2—2 of Figure 1 looking in the direction indicated.

Figure 3 is a similar cross-sectional view taken along the lines 3—3 of Figure 1.

Figure 1:
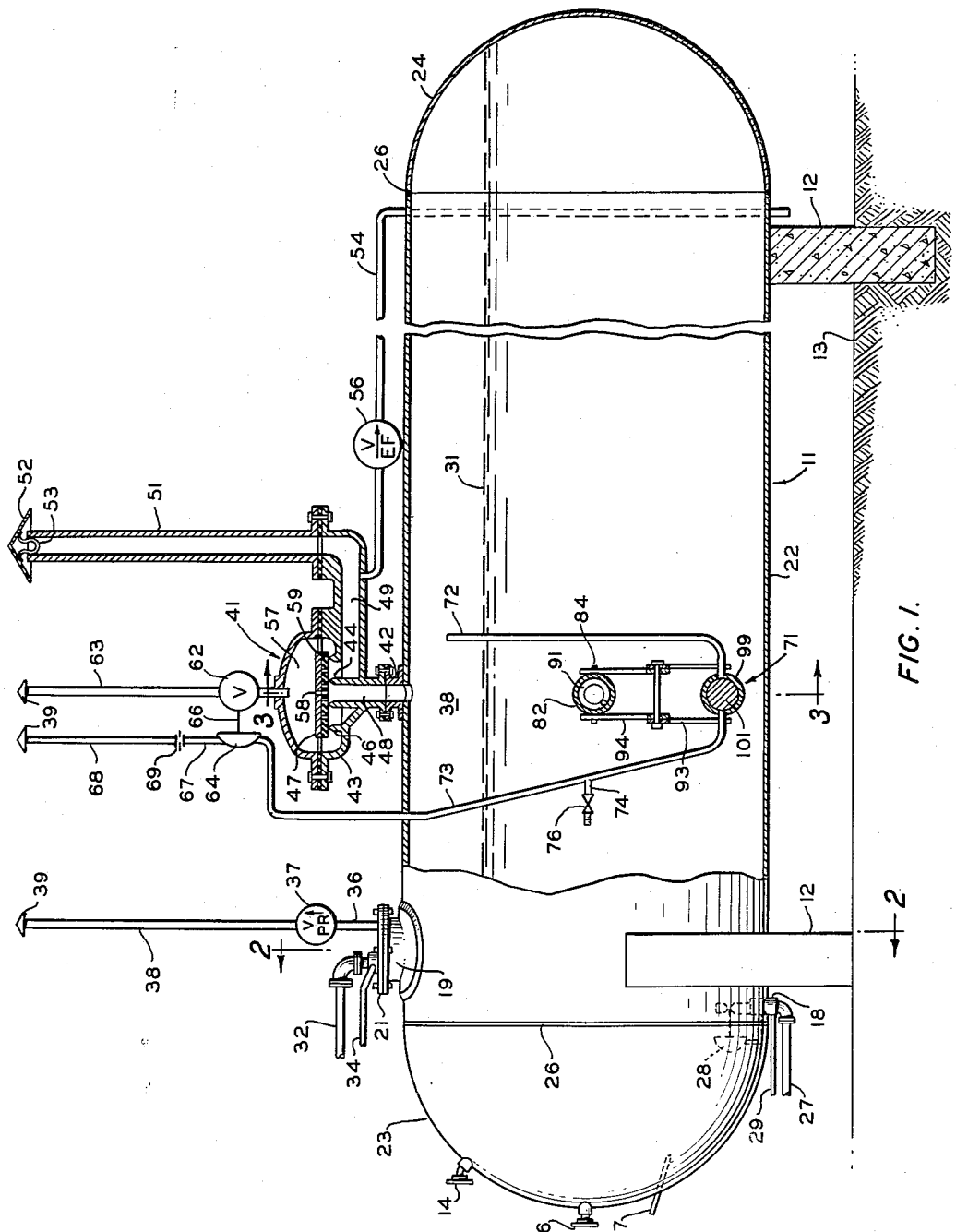
Figure 1 is an elevational view with a portion broken away to show features of construction of a volatile inflammable liquid storage tank embodying the present invention.

Figures 4, 5, and 6 are cross-sectional views of three modified valves which may be employed in place of the control valve 71 shown in Figures 1 and 3.

Figure 7:
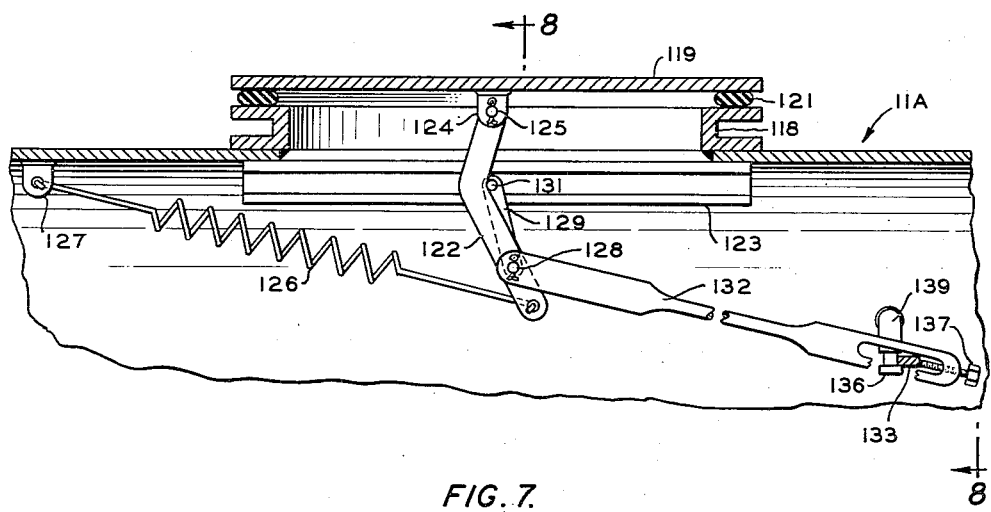

Figure 7 is a fragmentary cross-sectional view of a modified, entirely mechanical, tank depressuring system.

Figure 8:
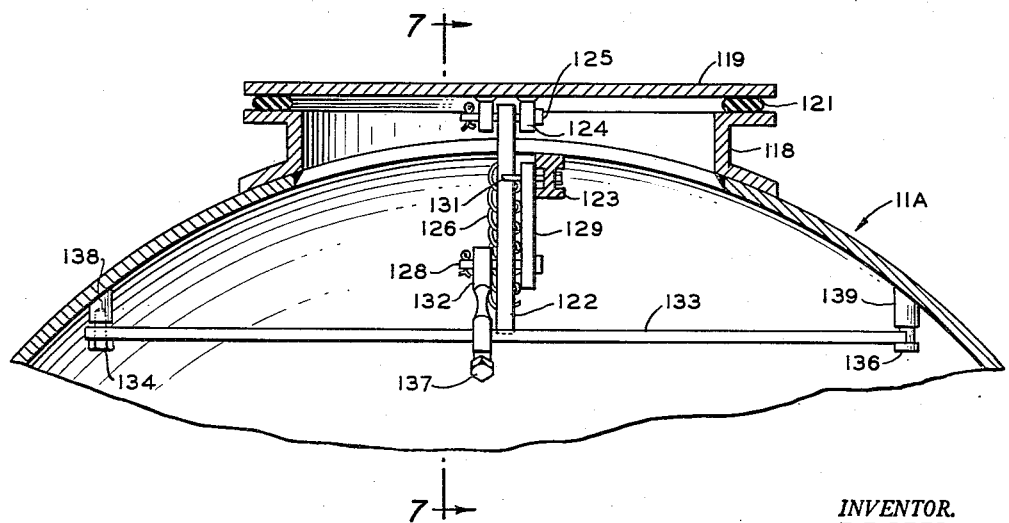

Figure 8 is a cross-sectional view taken along the lines 8—8 of Figure 7 looking in the direction indicated.

Figure 1 shows a liquid storage tank generally designated as 11. It is shown with an emergency tank depressuring valve system embodying the present invention. Tank 11 is otherwise a conventional storage tank for storing the volatile inflammable liquids under their normal vapor pressure, for example, such liquids as liquefied petroleum gas, known as LP gas, of which the major constituent is propane, or butane, or mixtures thereof.

Various means, known to the prior art, may be used to support tank 11, such as concrete foundations 12, resting on or extending into the ground 13. Such tanks are conventionally supplied with a pressure gauge 14, liquid level gauge 16, thermometer well 17, lower connection 18, manhole connection 19, and manhole cover 21. While tank 11 may be fabricated in a number of different ways, all of which can still employ the present invention, the tank shown for purpose of illustration is one composed of a central cylindrical section 22 having two hemispherical, or elliptical (not shown) heads 23 and 24 welded thereto by welds 26. Obviously any known approved tank construction may be employed, such as those using overlapping sections riveted together (not shown).

It is old in the prior art to equip tank outlet 18 with a liquid line 27 and to control communication between line 27 and the interior of tank 11 by means of a motor valve 28 operated by hydraulic fluid supplied and removed through line 29. Liquid line 27 may be used for filling or draining tank 11 with its liquid contents 31. It is also in the prior art to supply a manhole cover 21 with a vapor line 32 whose communication with the tank interior is controlled by motor valve 33 (see Figure 2) actuated through hydraulic line 34 in a manner similar to valve 28. Manhole cover 21 may also contain a vapor outlet line 36 connected to the inlet of a pressure relief valve 37 set to relieve the pressure of vapor 38 in tank 11 whenever it reaches an excessive pressure of, for example, 300 pounds per square inch gauge and to close when this pressure has dropped to 280 pounds per square inch. It is customary to provide the outlet of relief valve 37 with a stack 38 which preferably should be at least seven feet high, which may be provided at its upper open end with a rain cap 39. While all of the equipment described up to this point in Figure 1 is useful with, and may be employed in conjunction with the present invention, it is all conventional and not essential to the present invention, it being obvious that such items as pressure gauge 14, liquid level 16, thermometer well 17 and the like can be employed, or not employed, if desired, and the same is true of many other conventional pieces of equipment (not shown) which are conventionally used in such a storage tank 11.

The vapor depressuring valve generally designated as 41 comprises an outlet connection 42 on tank 11 to which valve body 43 is secured. Valve body 43 is provided with two concentric valve seats 44 and 46 on top of which seats rests a valve plate 47. Valve 41 thereby has an inlet 48 and an outlet 49 both controlled by valve 47 and seats 43 and 44. Outlet 49 is preferably provided with a stack 51 at least seven feet high to carry the escaping vapors at least that distance above tank 11. Stack 15 may be provided with a rain cap 52 of the same type as cap 39, only larger, the rain cap being lightly secured in the end of stack 51 by friction with the sides of U-shaped spring 53, the ends of which may be spot welded to cap 52, so that vapors escaping in quantities through line 51 may blow rain cap 52 off to allow increased flow through stack 51. While not absolutely necessary, in some instances, it has been found desirable to provide outlet 49 with a liquid drain line 54 to drain any condensate, or water which may come down stack 51 in case rain cap 52 has become displaced. In order to drain liquid through line 54 it must pass downwardly to the ground, but it can be led off to some point remote from tank 11. In any event, line 54 being of small diameter, it would not convey any large quantities of vapor, and furthermore it may be provided with an excess flow check valve 56 which will allow the passage of relatively slowly moving small amounts of liquid, or vapor, but which will promptly close upon increased flow of vapor and completely stop the same. Valve 56 may be any excess flow check valve from the prior art, such as that shown in the patent to R. W. Thomas, 2,121,936 of June 28, 1938.

Above valve 47 is a chamber 57 which is normally maintained full of vapor at the same pressure as vapor 38 in tank 11 by means of an orifice 58 extending through plate valve 47. In order to increase the sealing efficiency of valve plate 47, its lower surface may be provided with a layer of thin resilient material 59, such as any flexible polymeric plastic packing or sealing material as synthetic rubber (such as the type known by the trademark name "Neoprene"). Obviously, this packing 59 should be unaffected by liquid 31 or its vapors 38. While not essential, it is convenient to provide layer 59 with the bleeder holes shown (see 61 of Figure 3) and to secure layer 59 to plate 47 by a suitable cement, such as the chlorinated rubber cement described in Garvey 2,443,678 of June 22, 1948.

As the area of the inlet 48 inside seat 44 is much smaller than the area of the outlet 49 inside seat 46, the same pressure in space 57 as is present in inlet 48 will hold valve plate 47 in place closing inlet 48 until such time as the pressure in space 57 falls below that in space 38 by a considerable amount, which can only occur by opening valve 62 and allowing the gas in space 57 to vent through stack 63 and around rain cap 39 to the atmosphere, which can only occur when pressure fluid is supplied to motor 64, which then opens valve 62 by means of valve actuating rod 66. The pressure in diaphragm motor chamber 64 is normally atmospheric because of bleed line 67 venting the same to stack 68, and the atmosphere, through orifice 69. When valve 71 permits, upon yielding of the wall of tank 11, vapor under pressure from space 38 will pass through lines 72 and 73 into motor 64 faster than this vapor can pass through orifice 69, whereupon the pressure in 64 increases opening valve 62.

In some cases, it may be desirable to have more than one tank distortion operated valve 71 located in different portions of the tank, each provided with a separate vapor inlet pipe 72, and in such cases, the extra valve 71 (not shown), may be connected to a line 73 by line 74 provided with a cut-off valve 76, which is closed in Figure 1 where only one valve 71 is employed.

Figure 2 is a cross-sectional view of Figure 1 taken along the line 2—2 looking in the direction indicated and shows some of the features shown in Figure 1 from inside tank 11. For example, orifice 77 provides for passage of vapor under pressure from space 38 to pressure gauge 14. Ball float 78 moves lever arm 79 in response to liquid level 31 to transmit rotary motor to the indicator of liquid level gauge 16 and inwardly extending closed end pipe 17 is the same thermometer well 17 shown in Figure 1.

Figure 3 is a cross-sectional view of Figure 1 taken along the lines 3—3 looking in the direction indicated and shows details of tank 11, and valves 41 and 71 along with the actuating systems for valves 71, said actuating system being generally designated as 81.

When tank 11 is heated to a point where the metal starts to yield, the liquid level 31 may be anywhere from the point shown in the drawing down to the bottom of the tank, in other words, in some instances, the liquid may have all, or nearly all, evaporated. In any event, while the internal vapor pressure inside the tank, acts in all directions merely tending to expand the diameter of the tank, the force of gravity on the tank 11, and on whatever liquid contents 31 may remain, tends to distort the tank in such a way that the diameter in its horizontal plate Figure 3 increases greater than any other dimensional change. Therefore in Figure 3 valve actuating device 81 has been designed to employ this change in diameter in the horizontal plate.

Obviously each design of tank (only one design shown) will have its own peculiar directions of maximum expansion and yielding which will be obvious to an engineer, depending also on the type of supports and other details of construction employed, so that if different supports than 12 are used, or different shape tank is used, an engineer may place device 81 orientated in a different direction to take advantage of increased yielding in a different direction caused by the different tank and/or support construction (not shown) without departing from the present invention.

Valve actuating mechanism 81 may comprise a pipe 82 preferably having its ends slotted, or castellated at 83 to allow for the passage of pins, or bosses 84. Pipe, or sleeve 82 guides the ends of caliper contact members 87 and 88. Members 87 and 88 have pointed ends 89 engaging the wall of tank 11 at points near its diameter in a horizontal plane, said ends being urged into calipering engagement with the tank by a helical compression spring 91. In order to aid in the positioning of device 81 tank 11 may be provided with bosses, or ledges 92, for supporting and positioning the ends 89. Members 87 and 88 are provided with protruding bosses, or pins 84 which pass through holes in lever arms 93 and 94 respectively. Lever arms 93 and 94 are pivoted together at 96 and, in turn, are pivoted at 97 and 98 to cylinder 99 and piston 101 respectively of valve 71 to operate the same.

While the distance between pivots 84 and 96 as shown in Figure 3 is only a little less than the distance between pivots 96 and 97 and 96 and 98 respectively, it can of course be made much shorter, and arms 93 and 94 can be bent much more than the direction shown in order that the motion of piston 101 in cylinder 99 may be multiplied so that a slight increase in the distance between points 89 will move piston 101 a greater distance in cylinder 99 and thus open valve 71 after only a slight movement of points 89.

When piston 101 moves sufficiently through the cylinder 99 vapor from space 38 passes through pipe 72 into pipe 73 to actuate motor 64.

It is preferred to have a vapor pipe 72, as the use of vapor results in less fluid passing through orifice 69 to the atmosphere, but it is not necessary to have vapor pipe 72, as it may be removed, and liquid 31 then passed through valve 71 and pipe 73 to actuate motor 64.

Further control valve modifications are shown in Figures 4 to 6. In Figure 4 a cylinder 99A is shown which could be substituted for cylinder 99 in Figure 3, there being a piston 101A which differs from 101 in Figure 3 by having a pair of annular grooves 102 cut therein in which are placed synthetic rubber O sealing rings 103, if a better seal is desired between cylinder 99A and piston 101A. Rings 103 may be made of any resilient material, such as those mentioned above for seal 59. Actually a perfect seal is not necessary because it will be noted in Figure 1 that the leakage of a small amount of vapor through line 73 into motor 64 will not actuate the same because it will escape to the atmosphere through orifice 69 as fast as it leaks by valve 71. It is only when valve 71 is opened that sufficient fluid passes through pipe 73 to raise the pressure in chamber 64 before it escapes through restriction 69. It will be noted in Figure 3 that there is a space in cylinder 99 back of piston 101 which is not connected to any other portion of the system. In Figure 4, however, the corresponding space communicates with line 106 in which may be connected as either pipe 72 or 73 in Figure 1, while pipe 107 is connected as the other one of these two pipes in Figure 1. It is preferred to have pipe 106 be connected as pipe 72, because then the vapor pressure in space 110 will tend to balance the vapor pressure 38 and hydrostatic head of liquid 31 in space 108. In all of Figures 4 to 6, the part corresponding to vapor line 72 can be cut off short to supply liquid instead of vapor as discussed above with relation to Figure 1.

In Figure 5 cylinder 99B is provided with one inlet 109 and two outlets 111 and 112 leading to a single pipe 113, or 113 can be a single inlet leading to inlets 111 and 112 and the device have one outlet 109. It will be noted that on piston rod 114 there are two pistons 116 and 117. The advantage of this form of construction is that the pressure of the fluid in tank 11 would be balanced out on the left side of piston 116 and the right side of piston 117, while relative movement in either direction would rapidly connect either pipe 111 or pipe 112 to pipe 109. This would have an advantage because while distortion and yielding of the tank walls in one direction is expected, something unexpected might happen, such as another tank being blown through the air and striking against the side of the present tank causing distortion and yielding in the vertical instead of the horizontal direction and compression in the horizontal direction, in which case the valve 99B of Figure 5 would still operate to relieve the pressure.

In Figure 6 is shown the modifications of a device for use when liquid 31 is employed to actuate motor 64. A cylinder 99C is shown in place of cylinder 99 of Figure 3 and piston 101C in place of piston 101, while 73C would be connected up as 73 is shown connecting in Figure 1. No vapor line 72 is necessary, as when piston 101C moves sufficiently in either direction, the liquid 31 in tank 11 will pass inside cylinder 99C into pipe 73C from whichever side it is exposed. In speaking of liquid 31, it should be realized that at the time of yielding the level of 31 may be below cylinder 99C, in which case, vapor passes into pipe 73C instead of liquid, but in either case of vapor or liquid the operation of motor 64 is the same.

It should be understood that any of the pistons in Figures 1, 3, 5 or 6 may be supplied with O rings 103 as shown in Figure 4 on the piston 101A, and the piston 101A of Figure 4 may operate without the O rings 103.

Figures 7 and 8 illustrate a considerably different embodiment, in that there are no pipes, motors, pistons, or cylinders whatsoever. Instead the operation is entirely that of mechanical linkages. The tank generally designated as 11A may be constructed quite the same as tank 11 and is provided with a manhole fitting 118 and a manhole cover 119 between which a gasket 121 of suitable resilient material, such as used for part 59 above, may be disposed as desired.

Manhole cover 119 is held down on gasket 121 by means of a toggle action system of levers anchored to strong back 123. Strong back 123 may be an I beam disposed as shown, with its ends preferably welded to tank 11A. The lever system is as follows:

Bent lever 122 is pivoted at 125 to ears 124 secured to manhole cover 119. At the other end of lever 122 is secured one end of helical tension spring 126, the other end of the spring being secured to an ear 127 fastened to the tank shell 11A. Lever 122 is also pivoted at 128 to toggle lever 129 which in turn is pivoted at 131 to strong back 123. Lever 122 is held against pivot 131 against the tensile force of spring 126 by tie-rod 132 to bar 133 extending beyond pins 134 and 136 secured to the wall of tank 11A. Turnbuckle screw 137 is provided in the end of tie-rod 132 to permit adjustment of the entire device. As shown in Figure 8, pins 134 and 136 are secured to tank 11A at 138 and 139 respectively and one of pins 134 or 136 may act as a pivot for bar 133, pin 134 being so shown in Figure 8, although both ends of bar 133 could merely be pulled against each of the pins respectively as shown at 136. However, it is preferable to have one end pivoted at 134 because this makes accidental disalignment of bar 133 much less likely, and therefore this construction is preferable.

*Operation*

The operation of Figures 1 to 3 is as follows:

Assuming there is a fire in the vicinity of tank 11, at first the vapor pressure in space 38 over 300 pounds per square inch will be vented through relief valve 37 and valve 47 will stay seated on seats 44 and 46 due to the vapor pressure in space 57 over the area of seat 46 being greater than atmospheric pressure over the area of outlet 49 plus the vapor pressure of 38 over the area of inlet 48.

As the temperature of tank 11 increases, it reaches a critical temperature at which it begins to soften, and to distort and stretch. When a small amount of such distortion has occurred spring 91 in Figure 3 will have urged points 89 outwards against the expanding tank 11, and through the pantographic lever action of arms 93 and 94 a magnified movement of cylinder 99 and piston 101 will occur, with the piston moving to the left and the cylinder to the right thereby placing vapor 38 in pipe 72 in communication with pipe 73. A large flow of vapor will then occur through pipe 72, valve 71 and pipe 73 into motor 64 which will open valve 62, as sufficient vapor cannot bleed through restriction 69 to avoid raising the pressure in motor 64. Once valve 62 is open, the vapor in space 57 will pass out through valve 62 and stack 63 to the atmosphere much faster than it can be replaced from space 38 through orifice 58, and there then being only atmospheric pressure on the top of plate 47 and atmospheric pressure in outlet 49, the superior pressure in inlet 48 will raise valve plate 47 and allow the vapors 38 in tank 11 to escape through passages 48 and 49 and stack 51 to the atmosphere, that part passing through pipe 54 promptly closing valve 56, if pipe 54 and valve 56 are present. Pipe 54 and valve 56 can be eliminated and the hole where they connect to 49 closed off. The pressure in tank 11 drops to substantially atmospheric pressure almost immediately and tank 11 does not explode, but merely passes vapor 38 out stack 51 where it burns at least seven feet above tank 11. The burning of such large quantities of vapors is unfortunate, but is much preferable to having the tank explode.

Whenever it is desired to add or subtract liquid or vapor from tank 11 in the normal course of operations valves 28 and 33 respectively can be opened or closed by means of hydraulic fluids in lines 29 and 34 respectively and the desired vapor or liquid added or removed by suitable pumps or compressors (not shown).

During the long period of waiting for such an extremely severe fire emergency to occur (it being strongly hoped that it will never occur) any gas passing through pipe 73 to motor 64 will not operate the motor but will pass through restriction 69 and stack 68 to the atmosphere. Similarly during this period any water which condenses or accumulates in outlet 49 will drain through pipe 54, and any leakage of vapor through valve 62 will be replaced by vapor through orifice 58.

The operation of Figures 4 to 6 is obvious, the fluid under pressure passing from one opening to another depending on the position of the piston as has been explained above in describing Figures 4 to 6.

The operation of Figures 7 and 8 is as follows:

When tank 11A starts to yield, it bulges out and pins 134 and 136 move further apart. As soon as bar 133 is pulled clear of pin 136 by pin 134, spring 126 because of its attachment to ear 127 will pull on lever 122 which will pull on rod 132 and pull bar 133 in an arc around pin 134, at the same time moving pivot 128 to the left of a line drawn through pivots 125 and 131. As soon as the latter occurs, the pressure in tank 11A will blow manhole cover 119 off of manhole fitting 118. This will immediately reduce the pressure in tank 11A to substantially atmospheric pressure and while a big fire will result, it will be less dangerous than an explosion due to a rupture of tank 11A. If desired, manhole fitting 118 can be provided with a stack rising to a suitable height above tank 11A and surrounding manhole cover 119, similar to stack 51 in Figure 1.

While certain numerical values have been given for purposes of illustration, such as 300 pounds per square inch, not less than seven feet, 1200° F. and the like, they are not critical, as obviously the invention can be designed for use with tanks of different metals, different pressures and different volatile and inflammable liquids, with different temperatures at which the different metals or alloys yield, and the length of the stacks 38, 68, 63 and 51 can be selected of a length suitable to separate the burning vapors from the tank by any distance decided on by an engineer.

The present invention is not a vapor relief device which operates upon ordinary thermal expansion, or upon flexing of a shallow conical tank roof from a concave to a convex configuration, but instead this invention acts only upon yielding beyond the elastic limit of the metal wall. In order to do this the parts are so proportioned and disposed in Figure 1 that the control valve 71 will still be closed when all thermal expansion at the temperature at which the metal rapidly loses tensile strength has occurred. With relief valve 37 maintaining an internal pressure which is the rated pressure capacity of the tank, which may be, for example, 280 to 300 pounds per square inch, there will be no substantial change in tank dimensions, and there is no shallow conical roof to flex from concave to convex involved. In Figure 7 the parts are proportioned and disposed so that bar 133 is still hanging on pivot 136 when all thermal expansion has occurred at the temperature at which the metal rapidly loses tensile strength. With such adjustment of the structures of Figures 1 and 7, any slight additional increase in diameter will be due to yielding beyond the elastic limit and/or permanent thermal and gravity deformation, both signs of impending imminent rupture, and this slight permanent yielding will open valve 71 of Figure 1, on release bar 133 from pin 136 of Figure 7, and cause the operation of the invention. By the rated pressure capacity of the tank is meant the opening pressure that relief valve 37 is set for, and when the metal is heated to a critical temperature a known amount of thermal expansion has occurred and further expansion necessarily includes some non-elastic yielding which will not disappear upon cooling. The expansion characteristics and temperature of non-elastic yielding of each metal being known, the minimum amount of expansion which must necessarily include some non-elastic yielding can easily be calculated, and this amount of expansion is chosen as that which will allow the actuating means to open the depressuring valve.

While certain specific embodiments have been shown and discussed for purposes of illustration, obviously, the invention is not limited thereto.

Having described my invention, I claim:

1. The process of storing inflammable liquid in a tank during a large adjacent fire which comprises relieving the additional internal vapor pressure developed in said tank by the heat of said fire to the rated pressure capacity of said tank, and maintaining said rated pressure until sufficient expansion of said tank has occurred to include non-elastic yielding outwardly under internal gas pressure of the material forming the wall of said tank, and then relieving the tank vapor pressure to substantially atmospheric pressure to prevent the bursting of said tank.

2. The process of storing inflammable liquid in a tank during a large adjacent fire which comprises maintaining pressure until sufficient expansion of said tank has occurred to include non-elastic yielding outwardly under internal gas pressure of the material forming the wall of said tank, and then relieving the tank vapor pressure to substantially atmospheric pressure to prevent the bursting of said tank.

3. A pressure relief system comprising a metal tank for storing liquids, a vapor relief valve connecting said tank to the atmosphere at a point at least seven feet above said tank whenever the vapor pressure in said tank exceeds the rated pressure capacity of said tank, a depressuring valve connecting said tank to the atmosphere at a point at least seven feet above said tank, means for normally holding said depressuring valve closed, and means for overcoming said holding means and opening said depressuring valve only responsive to sufficient expansion of said tank to include non-elastic yielding outwardly under internal gas pressure of the material forming the wall of said tank, whereupon said tank vapor pressure quickly falls to substantially atmospheric pressure and bursting of said tank is avoided.

4. A pressure relief system comprising a metal tank for storing liquids, a vapor relief valve connecting said tank to the atmosphere whenever the vapor pressure in said tank exceeds the rated pressure capacity of said tank, a depressuring valve connecting said tank to the atmosphere, means for normally holding said depressuring valve closed, and means for overcoming said holding means and opening said depressuring valve only responsive to sufficient expansion of said tank to include non-elastic yielding outwardly under internal gas pressure of the material forming the wall of said tank, whereupon said tank vapor pressure quickly falls to substantially atmospheric pressure and bursting of said tank is avoided.

5. A pressure relief system comprising a metal tank for storing liquids, a depressuring valve connecting said tank to the atmosphere at a point at least seven feet above said tank, means for normally holding said depressuring valve closed, and means for overcoming said holding means and opening said depressuring valve only responsive to sufficient expansion of said tank to include non-elastic yielding outwardly under internal gas pressure of the material forming the wall of said tank, whereupon said tank vapor pressure quickly falls to substantially atmospheric pressure and bursting of said tank is avoided.

6. A pressure relief system comprising a metal tank for storing liquids, a depressuring valve connecting said tank to the atmosphere, means for normally holding said depressuring valve closed, and means for overcoming said holding means and opening said depressuring valve only responsive to sufficient expansion of said tank to include non-elastic yielding outwardly under internal gas pressure of the material forming the wall of said tank, whereupon said tank vapor pressure quickly falls to substantially atmospheric pressure and bursting of said tank is avoided.

7. A pressure relief system comprising a metal tank for storing liquids, a vapor relief valve connecting said tank to the atmosphere through a stack whenever the vapor pressure in said tank exceeds the rated pressure capacity of said tank, said tank having an outlet communicating with the inlet of a depressuring valve body, said valve body having an outlet communicating with the atmosphere through a stack, a water drain line connected to said stack, an excess flow check valve in said water drain line to prevent substantial vapor flow therethrough, a depressuring valve chamber in said body, valve seats in said chamber around said inlet and said outlet of said body, a depressuring valve in said chamber resting on said seats and closing both said inlet and said outlet, a bleed hole through said depressuring valve placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, a restriction in said second outlet conduit, and a second control valve assembly comprising a second control valve and a second control valve seat in said inlet conduit, and means to open said second control valve in said inlet conduit to said motor in response to sufficient expansion of said tank to include non-elastic yielding outwardly under internal gas pressure of the material forming the wall of said tank, comprising two members each biased against opposite walls of the tank along a diameter thereof most likely to expand on heating of said tank, one of said members being connected by pantograph levers to said second control valve and the other to said second control valve seat in said inlet conduit to said motor to open said second control valve only upon said non-elastic yielding.

8. A pressure relief system comprising a metal tank for storing liquids, said tank having an outlet communicating with the inlet of a depressuring valve body, said valve body having an outlet communicating with the atmosphere through a stack, a water drain line connected to said stack, an excess flow check valve in said water drain line to prevent substantial vapor flow therethrough, a depressuring valve chamber in said body, valve seats in said chamber around said inlet and said outlet of said body, a depressuring valve in said chamber resting on said seats and closing both said inlet and said outlet, a bleed hole through said depressuring valve placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, a restriction in said second outlet conduit, and a second control valve assembly comprising a second control valve and a second control valve seat in said inlet conduit, and means to open said second control valve in said inlet conduit to said motor in response to sufficient expansion of said tank to include non-elastic yielding outwardly under internal gas pressure of the material forming the wall of said tank, comprising two members each biased against opposite walls of the tank along a diameter thereof most likely to expand on heating of said tank, one of said members being connected to said second control valve and the other to said second control valve seat in said inlet conduit to said motor to open said second control valve only upon said non-elastic yielding.

9. A pressure relief system comprising a metal tank for storing liquids, a vapor relief valve connecting said tank to the atmosphere through a stack whenever the vapor pressure in said tank exceeds the rated pressure capacity of said tank, said tank having an outlet communicating with the inlet of a depressuring valve body, said valve body having an outlet communicating with the atmosphere through a stack, a water drain line connected to said stack, an excess flow check valve in said water drain line to prevent substantial vapor flow therethrough, a depressuring valve chamber in said body, valve seats in said chamber around said inlet and said outlet of said body, a depressuring valve in said chamber resting on said seats and closing both said inlet and said outlet, a bleed conduit placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, and a second control valve in said inlet conduit, and means to open said second control valve in said inlet conduit to said motor only in response to sufficient expansion of said tank to include non-elastic yielding outwardly under internal gas pressure of the material forming the wall of said tank.

10. A pressure relief system comprising a metal tank for storing liquids, a vapor relief valve connecting said tank to the atmosphere whenever the vapor pressure in said tank exceeds the rated pressure capacity of said tank, said tank having an outlet communicating with the inlet of a depressuring valve body, said valve body having an outlet communicating with the atmosphere, a depressuring valve chamber in said body, valve seats in said chamber around said inlet and said outlet of said body, a depressuring valve in said chamber resting on said seats and closing both said inlet and said outlet, a bleed conduit placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, a restriction in said second outlet conduit, and a second control valve assembly comprising a second control valve and a second control valve seat in said inlet conduit, and means to open said second control valve in said inlet conduit to said motor in response to sufficient expansion of said tank to include non-elastic yielding outwardly under internal gas pressure of the material forming the wall of said tank, comprising two members each biased against opposite walls of the tank along a diameter thereof most likely to expand on heating of said tank, one of said members being connected by pantograph levers to said second control valve and the other to said second control valve seat in said inlet conduit to said motor to open said second control valve only upon said non-elastic yielding.

11. A pressure relief system comprising a metal tank for storing liquids, said tank having an outlet communicating with the inlet of a depressuring valve body, said valve body having an outlet communicating with the atmosphere, a depressuring valve chamber in said body, valve seats in said chamber around said inlet and said outlet of said body, a depressuring valve in said chamber resting on said seats and closing both said inlet and said outlet, a bleed conduit placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, a restriction in said second outlet conduit, and a second control valve assembly comprising a second control valve and a second control valve seat in said inlet conduit, and means to open said second control valve in said inlet conduit to said motor in response to sufficient expansion of said tank to include non-elastic yielding outwardly under internal gas pressure of the material forming the wall of said tank, comprising two members each biased against opposite walls of the tank along a diameter thereof most likely to expand on heating of said tank, one of said members being connected by pantograph levers to said second control valve and the other to said second control valve seat in said inlet conduit to said motor to open said second control valve only upon said non-elastic yielding.

12. A pressure relief system comprising a metal tank for storing liquids, said tank having an outlet communicating with the inlet of a depressuring valve body, said valve body having an outlet communicating with the atmosphere, a depressuring valve chamber in said body, valve seats in said chamber around said inlet and said outlet of said body, a depressuring valve in said chamber resting on said seats and closing both said inlet and said outlet, a bleed conduit placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, a restriction in said second outlet conduit, and a second control valve assembly comprising a second control valve and a second control valve seat in said inlet conduit, and means to open said second control valve in said inlet conduit to said motor in response to sufficient expansion of said tank to include non-elastic yielding outwardly under internal gas pressure of the material forming the wall of said tank, comprising two members each biased against opposite walls of the tank along a diameter thereof most likely to expand on heating of said tank, one of said members being connected by pantograph levers to said second control valve and the other to said second control valve seat in said inlet conduit to said motor to open said second control valve only upon said non-elastic yielding.

13. A pressure relief system comprising a metal tank for storing liquids, said tank having an outlet communicating with the inlet of a depressuring valve body, said valve body having an outlet communicating with the atmosphere, a depressuring valve chamber in said body, valve seats in said chamber around said inlet and said outlet of said body, a depressuring valve in said chamber resting on said seats and closing both said inlet and said outlet, a bleed conduit placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, and a second control valve assembly comprising a second control valve and a second control valve seat in said inlet conduit, and means to open said second control valve in said inlet conduit to said motor in response to sufficient expansion of said tank to include non-elastic yielding outwardly under internal gas pressure of the material forming the wall of said tank, comprising two members each biased against opposite walls of the tank along a diameter thereof most likely to expand on heating of said tank, one of said members being connected by pantograph levers to said second control valve and the other to said second control valve seat in said inlet conduit to said motor to open said control valve only upon said non-elastic yielding.

14. A pressure relief system comprising a metal tank for storing liquids, said tank having an outlet communicating with the inlet of a depressuring valve body, said valve body having an outlet communicating with the atmosphere, a depressuring valve chamber in said body, valve seats in said chamber around said inlet and said outlet of said body, a depressuring valve in said chamber resting on said seats and closing both said inlet and said outlet, a bleed conduit placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, and a second control valve assembly comprising a second control valve and a second control valve seat in said inlet conduit, and means to open said second control valve in said inlet conduit to said motor in response to sufficient expansion of said tank to include non-elastic yielding outwardly under internal gas pressure of the material forming the wall of said tank, comprising two members each biased against opposite walls of the tank along a diameter thereof most likely to expand on heating of said tank, one of said members being connected to said second control valve and the other to said second control valve seat in said inlet conduit to said motor to open said second control valve only upon said non-elastic yielding.

15. A pressure relief system comprising a metal tank for storing liquids, said tank having an outlet communicating with the inlet of a depressuring valve body, said valve body having an outlet communicating with the atmosphere, a depressuring valve chamber in said body, valve seats in said chamber around said inlet and said outlet of said body, a depressuring valve in said chamber resting on said seats and closing both said inlet and said outlet, a bleed conduit placing said inlet in restricted communication with that portion of said chamber on the other side of said depressuring valve from said seats, said chamber having a first outlet conduit connecting said last mentioned portion to the atmosphere, a first control valve in said outlet conduit, an expansible chamber motor for operating said control valve, said motor having an inlet conduit connected to the tank and a second outlet conduit connected to the atmosphere, and a second control valve in said inlet conduit, and means to open said second control valve in said inlet conduit to said motor only in response to sufficient expansion of said tank to include non-elastic yielding outwardly under internal gas pressure of the material forming the wall of said tank.

16. A pressure relief system comprising a metal tank for storing liquids, said tank having an outlet, a depressuring valve closing said outlet, and means for opening said depressuring valve to reduce the tank vapor pressure to substantially atmospheric pressure upon sufficient expansion of said tank to include non-elastic yielding outwardly under internal gas pressure of the material forming the wall of said tank, comprising a first lever pivoted to said valve, a second lever pivoted to said tank, said first and second levers being pivoted to each other, means comprising a helical tension spring pivoted to said tank and to one of said levers biasing said levers to move said valve from said outlet, and means restraining said levers against said biasing means until said non-elastic yielding occurs comprising two bosses on the tank walls, a third lever pivoted to one of said bosses and engaging the other until said non-elastic yielding has moved said bosses apart, and a rod connecting said third lever with one of said first two levers.

17. A pressure relief system comprising a metal tank for storing liquids, said tank having an outlet, a depressuring valve closing said outlet, and means for opening said depressuring valve to reduce the tank vapor pressure to substantially atmospheric pressure upon sufficient expansion of said tank to include non-elastic yielding outwardly under internal gas pressure of the material forming the wall of said tank comprising a first lever pivoted to said valve, a second lever pivoted to said tank, said first and second levers being pivoted to each other, means comprising a helical tension spring pivoted to said tank and to one of said levers biasing said levers to move said valve from said outlet, and means restraining said levers against said biasing means until said non-elastic yielding occurs.

18. A pressure relief system comprising a metal tank for storing liquids, said tank having an outlet, a depressuring valve closing said outlet, and means for opening said depressuring valve to reduce the tank vapor pressure to substantially atmospheric pressure upon sufficient expansion of said tank to include non-elastic yielding outwardly under internal gas pressure of the material forming the wall of said tank, comprising a first lever pivoted to said valve, a second lever pivoted to said tank, said first and second levers being pivoted to each other, means biasing said levers to move said valve from said outlet, and means restraining said levers against said biasing means until said non-elastic yielding occurs.

19. A pressure relief system comprising a metal tank for storing liquids, said tank having an outlet, a depressuring valve closing said outlet, and means for opening said depressuring valve to reduce the tank vapor pressure to substantially atmospheric pressure only upon sufficient expansion of said tank to include non-elastic yielding outwardly under internal gas pressure of the material forming the wall of said tank.

References Cited in the file of this patent

UNITED STATES PATENTS

| Number | Name | Date |
|---|---|---|
| 1,286,970 | Farr | Dec. 10, 1918 |
| 1,645,313 | Wiggins | Oct. 11, 1927 |
| 2,215,308 | Wiggins | Sept. 17, 1940 |
| 2,316,649 | Jurs | Apr. 13, 1943 |
| 2,687,618 | Bergstrom | Aug. 31, 1954 |